United States Patent [19]

Arai

[11] Patent Number: 5,190,161

[45] Date of Patent: * Mar. 2, 1993

[54] CYLINDRICAL ELEMENT FOR FILTERING AND SEPARATION

[75] Inventor: Koichi Arai, Kanagawa, Japan

[73] Assignee: Arai Machinery Corporation, Kanagawa, Japan

[*] Notice: The portion of the term of this patent subsequent to Oct. 22, 2008 has been disclaimed.

[21] Appl. No.: 661,746

[22] Filed: Feb. 27, 1991

Related U.S. Application Data

[63] Continuation-in-part of Ser. No. 449,123, Dec. 8, 1989, abandoned, which is a continuation of Ser. No. 184,081, Apr. 20, 1988, abandoned.

[30] Foreign Application Priority Data

Apr. 22, 1987 [JP] Japan .................. 62-097284

[51] Int. Cl.$^5$ .............................................. B07B 1/49
[52] U.S. Cl. .................................... 209/400; 209/395; 209/273; 210/497.1; 29/163.7
[58] Field of Search ............... 209/250, 273, 392, 393, 209/395, 400; 210/315, 484, 488, 489, 490, 497.1; 29/163.6, 163.7, 163.8; 166/231, 232, 233

[56] References Cited

U.S. PATENT DOCUMENTS

| | | | |
|---|---|---|---|
| 447,162 | 2/1891 | Prescott et al. | 209/400 X |
| 815,070 | 3/1906 | Culver | 209/400 X |
| 828,714 | 8/1906 | Cook | 166/231 |
| 937,861 | 10/1909 | Prinz | 29/163.7 X |
| 1,202,515 | 10/1916 | Hardin et al. | 166/233 |
| 1,546,528 | 7/1925 | Westphal | 166/231 |
| 1,644,121 | 10/1927 | Greene | 209/393 X |
| 1,763,996 | 6/1930 | Willers | 29/163.7 X |
| 1,858,592 | 5/1932 | Johnson | 209/393 X |
| 1,950,202 | 3/1934 | Willers | 166/231 |
| 2,046,459 | 7/1936 | Johnson | 209/393 X |
| 2,084,433 | 6/1937 | Chorlton | 210/497.1 X |
| 2,342,913 | 2/1944 | Williams et al. | 210/497.1 X |
| 2,983,379 | 5/1961 | Cram | 209/273 |
| 3,179,116 | 4/1965 | Jacobs | 210/497.1 X |
| 3,584,685 | 6/1971 | Boyd | 210/497.1 X |
| 3,586,172 | 6/1971 | Young | 209/273 X |
| 3,667,615 | 6/1972 | Likness | 166/231 X |
| 3,713,536 | 1/1973 | Hooper | 209/273 |
| 3,953,325 | 4/1976 | Nelson | 209/273 |
| 4,155,841 | 5/1979 | Chupka et al. | 209/273 |
| 4,383,918 | 5/1983 | Chupka et al. | 209/273 X |
| 4,410,424 | 10/1983 | Chupka et al. | 209/393 X |
| 4,569,763 | 2/1986 | Arai | 210/497.1 |
| 4,655,922 | 4/1987 | Arai | 210/497.1 |
| 4,657,079 | 4/1987 | Nagaoka | 166/231 |
| 4,742,872 | 5/1988 | Geske | 210/497.1 X |
| 4,818,402 | 4/1989 | Steiner et al. | 210/497.1 X |
| 4,818,403 | 4/1989 | Nagaoka | 29/163.7 X |
| 4,843,700 | 7/1989 | Arai | 29/163.7 |
| 4,904,378 | 2/1990 | Arai | 209/400 |
| 5,011,023 | 4/1991 | Arai | 209/400 |
| 5,028,008 | 7/1991 | Arai | 210/497.1 X |
| 5,047,148 | 9/1991 | Arai | 29/163.8 |
| 5,059,320 | 10/1991 | Arai | 210/497.1 X |

FOREIGN PATENT DOCUMENTS

| | | | |
|---|---|---|---|
| 0007394 | 7/1896 | Fed. Rep. of Germany | 209/393 |
| 0621511 | 11/1935 | Fed. Rep. of Germany | 166/232 |
| 56-53412 | 12/1981 | Japan. | |
| 63-243392 | 10/1988 | Japan. | |
| 0874110 | 10/1981 | U.S.S.R. | 210/497.1 |
| 0450534 | 7/1936 | United Kingdom. | |
| 2055052 | 2/1981 | United Kingdom | 210/499.1 |

Primary Examiner—Joseph E. Valenza
Attorney, Agent, or Firm—Dykema Gossett

[57] ABSTRACT

A cylindrical element for filtering various substances and separating particles therefrom is shown wherein a wire is cylindrically wound in the form of a helix to form a helical slit between the adjoining peripheral margins of the wire thereby increasing to the maximum the area for filtering or separation treatment. The helical slit forms a linear treatment hole with improved filtering and separation deficiency. The cylindrically wound wire may be supported by actually extending support members having grooves therein or by cylindrically-shaped support members having openings of various sizes and shapes. An embodiment of the invention wherein the cylindrical element is mounted in a pipe is also shown.

21 Claims, 3 Drawing Sheets

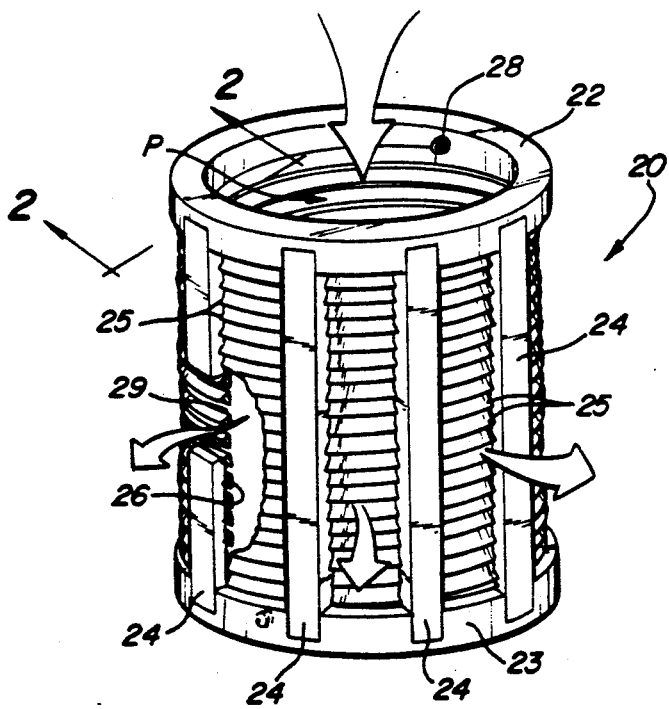
Fig-1
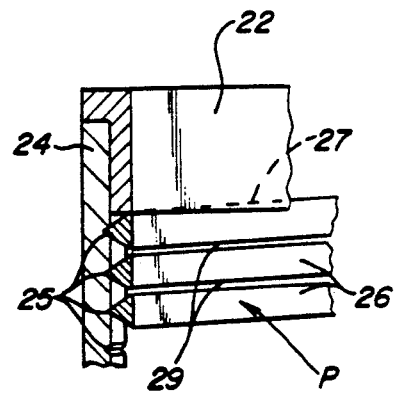
Fig-2
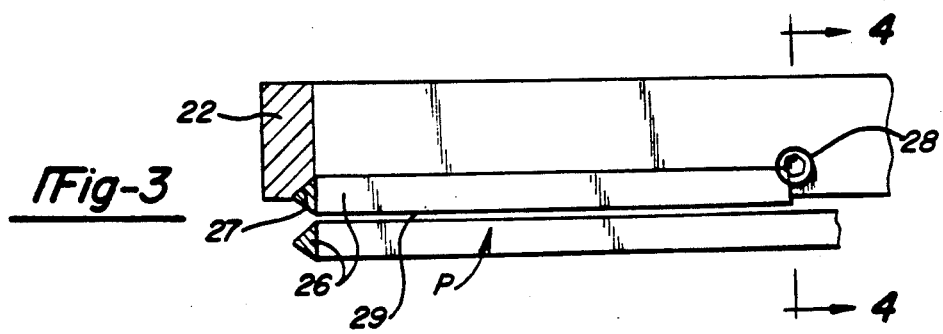
Fig-3
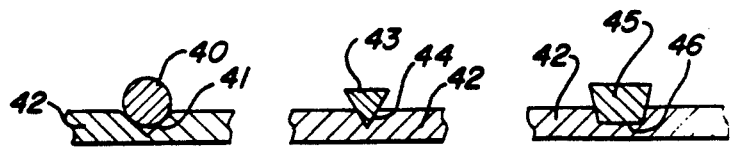
Fig-12  Fig-13  Fig-14
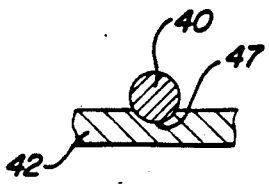
Fig-4
Fig-15
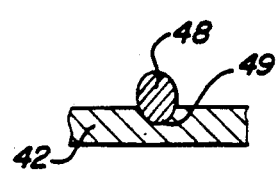
Fig-16

CYLINDRICAL ELEMENT FOR FILTERING AND SEPARATION

BACKGROUND OF THE INVENTION

1. Field of the Invention

The present application is a continuation-in-part of co-pending application Ser. No. 07/449,123, filed Dec. 8, 1989 (now abandoned), which was a continuation of abandoned application Ser. No. 07/184,081, filed Apr. 20, 1988.

The present invention relates to devices for filtering various substances and separating particles therefrom, and more particularly to a cylindrical filtering element for filtering substances and separating particles therefrom.

2. Description of the Prior Art

Prior art cylindrical elements of this type generally have a structure provided with a number of punched holes, or a structure provided with net-like or lattice-like filtering holes formed therein. In addition, porous filtering elements using ceramics have recently been developed.

However problems exist with these prior art devices that to date have not been solved. Prior art devices of the type having punched holes provide a device having filtering holes with small filtering areas, leading to a significant clogging phenomenon. The smaller the particles which are to be filtered, the more remarkable the tendency to clogging will be.

On the other hand, a ceramic cylindrical element with a porous structure, while filtering effectively, lets impermeable foreign matter accumulate on the inside of the porous structure, resulting in a serious loss of filtering ability. Accordingly the foreign matter in these type porous structures must be frequently removed by appropriate cleaning means.

SUMMARY OF THE INVENTION

The present invention is intended to solve the problems described above. The object of the present invention is to provide a cylindrical element for filtering various substances and for separating particles therefrom wherein a wire is cylindrically wound along the inner surface of a cylindrical frame plate in the form of a helix to form a helical slit between the adjoining peripheral margins of the wire, thereby increasing, to the maximum, the area to be subjected to the filtering or separation treatment. The helical slit provides a so-called linear treatment hole, thus improving the filtering or separation efficiency. The wire which is wound on the cylindrical frame may be of any desired cross-section, depending on the particular application to which the filter is to be put.

Because the element is cylindrically shaped, the treating area presented to a fluid that is to be treated, such as a liquid or gas flowing from the inside to the outside of the element, is much larger than those of planar elements. In addition, because the "hole" for filtering or separation treatment is a helical slit, it forms a so-called linear treatment hole with improved filtering ability. The treating operation can be conducted smoothly, because any residue such as filtered waste can be removed by a number of well known cleaning methods, such as a back-wash of a fluid from the outside to the inside of the element, or by scrapping by means of a scrapper.

BRIEF DESCRIPTION OF THE DRAWINGS

FIG. 1 is a partially cut-away perspective view of a construction embodying the present invention.

FIG. 2 is a partial sectional view, taken in the direction of the arrows, along the section line 2—2 of FIG. 1.

FIG. 3 is an enlarged cut-away view, partially in section, of the upper end of the construction shown in FIG. 1, and showing how the cylindrical wire is retained in an annular member.

FIG. 4 is a sectional view, taken in the direction of the arrows, along the section line 4—4 of FIG. 3.

FIG. 12 is a sectional view showing the wire member being of circular cross-section.

FIG. 13 is a sectional view, similar in part to FIG. 12, but showing the cylindrically wound wire member being of triangular cross-section.

FIG. 14 is a view similar in part to FIG. 12, but showing the circular wound wire member being of trapezoidal cross-section in a trapezoidal groove.

FIG. 15 is a view similar in part to FIG. 12, but showing the circularly wound wire member being in the form of a circular cross-section and being in a groove of circular cross-section.

FIG. 16 is a view similar in part to FIG. 13, but showing the circularly wound wire member being oval in cross-section, and being placed in an oval-shaped groove.

Figure 5:
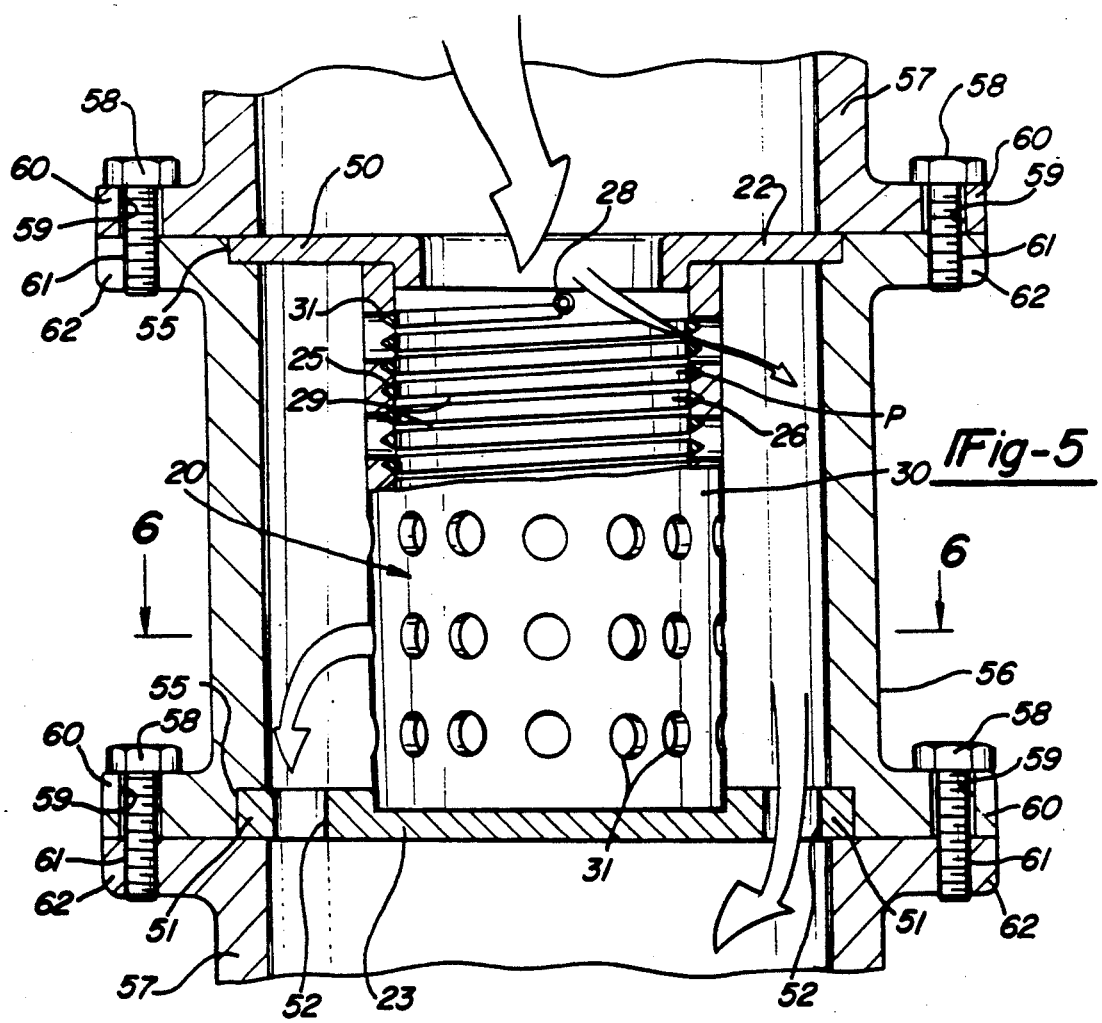
FIG. 5 is a partially cut-away side view showing a modification of the cylindrical element according to the present invention, wherein the construction shown in FIG. 1 is modified and mounted in a pipe.

It is to be understood that the present invention is not limited in its application to the details of construction and arrangement of parts illustrated in the accompanying drawings, since the invention is capable of other embodiments, and of being practiced or carried out in various ways within the scope of the claims. Also it is to be understood that the phraseology and terminology employed herein is for the purpose of description, and not of limitation.

DESCRIPTION OF THE PREFERRED EMBODIMENTS

Referring to FIGS. 1-4, there is shown a cylindrical frame plate 20 composed of upper annular member 22 and lower annular member 23 which, in the embodiment shown, are identical. A plurality of axially extending support frames 24 connect the upper annular member 22 with the lower annular member 23. The support frames 24 may be welded to the upper and lower annular members, or attached by any other suitable means, such as by screws, adhesives, sonic welding or the like.

Helical and discrete locking grooves 25 are cut precisely, and at a definite pitch along the inner surface of the cylindrical frame plate 20, from one end to the other.

A wire 26, of desired cross-section, is helically wound along the locking grooves 25 while being engaged therewith. The opposite ends of the wire 26 are respectively in engagement with the concave grooves 27 provided on the upper annular member 22 and lower annular member 23, and are secured thereto using locking devices 28 such as machine screws, thereby enabling fixed attachment thereto.

The wire 26 has a cross-section of an equilateral lateral triangle, and the engaging or helical grooves 25 are in the form of a "V", complimentary in shape to the wire cross-section. The adjoining inner surfaces of the wire 26 form a smooth cylindrical curve surface P.

A helical slit 29 of uniform width can thus be provided between the adjoining peripheral margins of the circularly wound wire 26, which is wound in a helical fashion and secured by the locking devices 28. The precision of the helical slit 29 is first determined by the processing precision of the wire 26, secondly, by precision of cutting the helical engaging grooves 25 into the support frames 24 and, finally, determined by the winding operation of the wire 26.

When the wire 26, having a cross-section of an equilateral triangle, is used, the precision of the width of the helical slit or linear treatment hole 29 is one micron, or less, thus easily assuring precision on the order of several to scores of microns.

The entire cylindrical frame plate 20, including the upper annular member 22, the lower annular member 23, and the support frames 24, as well as the wire 26, may be not only formed of metals, but also of other preferred materials, such as plastics or ceramics.

The operation of the present invention, based on the embodiment described above, is as set forth below. The smooth curved surface P, formed on the inside of the cylindrical frame plate 20 by means of the helical wire 26, is directed to the primary side as illustrated in FIG. 1, and then may be fixed to a pipe, similar to that shown in FIG. 5, by using the annular members 22 and 23 on their outer periphery, and a desired fluid to be treated i.e. a liquid or a gas is allowed to pass toward the slit holes 29 in the direction of the arrows. The residues, which are larger than the widths of the slit holes 29, are filtered and separated from the fluid which is subject to filtering. In contrast, any fluid containing particles smaller than the width of the helical slit 29 are allowed to pass therethrough.

The residues which are filtered and separated are piled up on the smooth, curved surface P on the inside of the cylindrical curved surface of the wire 26, and can easily and accurately be cleaned from the surface by means of back-washing or a scraper, such that the residues can be successively filtered and separated from the fluid as is desired.

Referring now to FIGS. 7-11, a modification of the present invention is described. The cylindrical frame plate 20 described above may be composed, rather than by the upper annular member 22 and the lower annular member 23 being connected by a plurality of axially extending support frames 24, of the hollow cylinders shown connecting the annular members. All of the cylinders shown may be processed in the form of a flat plate in which a number of holes of a desired shape are bored, or a lattice net plate or drain board, all of which are processed in the form of said hollow cylinder.

In this embodiment of the invention, a hollow cylinder 30 would be used to connect the upper annular member 22 and the lower annular member 23. All methods of joining the support frames 24 to the annular members 22 and 23 may also be used to join the annular members to the hollow cylinder. In addition, the annular members may be threaded on to the hollow cylinder, or other means, well known in the art for connecting two cylindrical objects may be used. The helical and discrete locking grooves 25 would be cut precisely and at a definite pitch on the inside of the hollow cylinder 30 from one end to the other. As before a wire 26 is helically wound along the locking grooves 25 while being engaged therewith. The opposite ends of the wire 26 would be respectively in engagement with concave grooves 27 provided in the upper and lower annular members, 22 and 23 respectively, as shown in FIG. 1. A locking device 28, such as a machine screw, would secure the wire 26 to the annular members 22 and 23, thereby enabling fixed attachment thereto. A plurality of round holes 31, preferably of staggered nature, pierce the hollow cylinder 30 to allow passage from the inside of the cylindrical frame plate 20, through the helical slits 29, and out through the holes 31.

Figure 8:
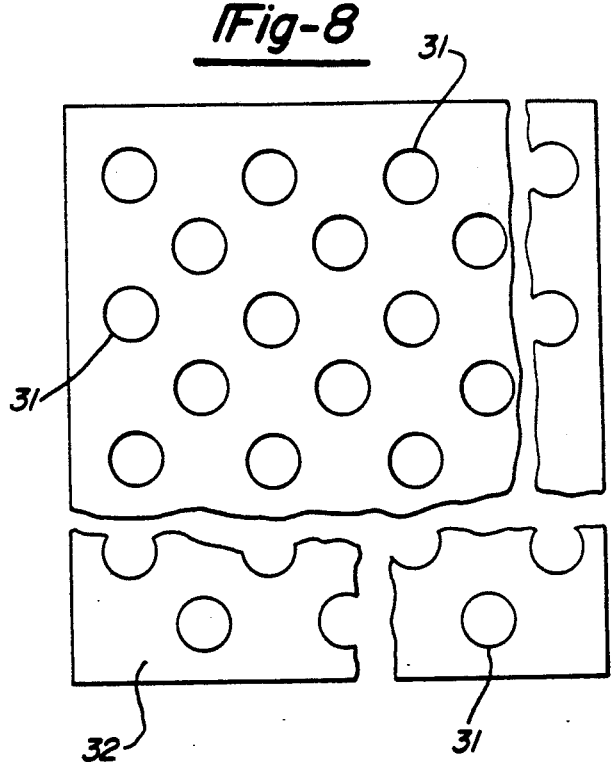
FIG. 8 is a fragmentary development view of the construction shown in FIG. 7, showing the staggered positioning of the holes in the cylindrical member.

As shown in FIG. 8, in this modification of the invention, the hollow cylinder 30 is formed of a flat steel plate 32 in which a plurality of circular holes 31 have been bored. The flat plate 32 will then be formed into the shape of a hollow cylinder, and have the upper annular member 22, or the lower annular member 23, secured thereto. The wire 26 will then be wound into the helical grooves 25 and secured. The other annular member will then be secured to the hollow cylinder 30, and the other end of the wire 26 will be secured in the concave groove 27 provided in the annular member by the locking device 28.

Figure 9:
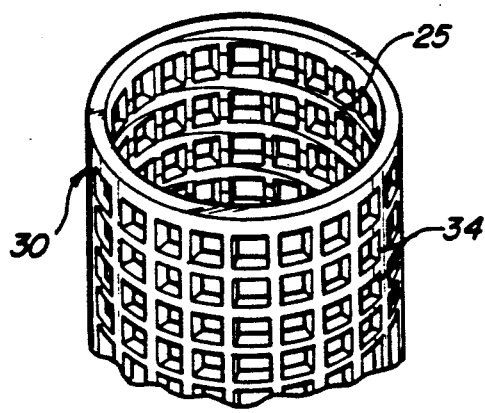
FIG. 9 is a partial perspective view of a further modification of the present invention, but showing the cylindrical member of FIG. 7 in the form of a drain board.
Figure 10:
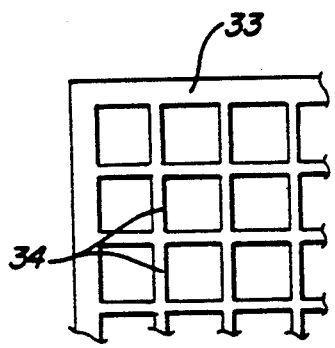
FIG. 10 is a development view of the construction shown in FIG. 9.

As shown in FIGS. 9 and 10, the hollow cylinder 30 may also be provided in the form of a drain board 33, having square holes 34, as shown in FIG. 10. The drain board of FIG. 10 is similar to the flat plate of FIG. 8, except that the square holes 34 are provided, instead of the round holes 31, before the drain board is formed into the hollow cylinder 30. As before, the helical grooves 25 are provided on the inside of the hollow cylinder.

Figure 11:
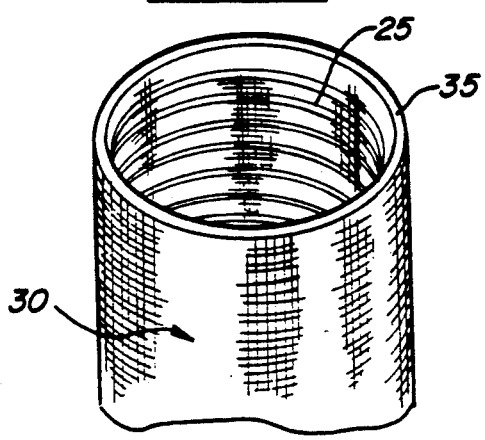
FIG. 11 is a partial perspective view of a further modification of the present invention showing a lattice net plate which may be used in a manner similar to the constructions shown in FIGS. 7 and 9 if desired.

Referring to FIG. 11, the hollow cylinder 30 may also be formed of a lattice net plate 35, which may be similar to the drain board 33, except that the square holes 34 are formed by a structure of crossed metal strips.

It should be understood that the thickness of the hollow cylinders 30 formed by the flat plate 32, the drain board 33, or the lattice net plate 35, can vary widely and still be well within the scope of the present invention. Whether the hollow cylinder is formed out of the flat plate, the drain board, or the lattice net plate will depend upon the particular application to which the present invention is applied.

Referring to FIGS. 12-16, it can be seen that the cross-section of the wire 26, and the helical grooves 25, can take many forms, and still be within the scope of the present invention.

Illustrated in FIG. 12 is a circular wire 40 in a wide "V" groove 41 provided in the support member 42, which may be identical to the support frames 24, or the hollow cylinder 30, and is now indicated by the numeral 42.

In FIG. 13, a triangular wire 43 is mounted in a narrow "V" groove 44, provided in support member 42.

In FIG. 14, a wire of trapezoidal cross-section 45, is mounted in a trapezoidal groove 46, in support member 42.

FIG. 15 shows the same circular wire 40 illustrated in FIG. 13, but mounted in a circular groove 47 provided in the support member 42.

FIG. 16 shows an oval wire 48, mounted in an oval groove 49, provided in the support member 42.

Figure 6:
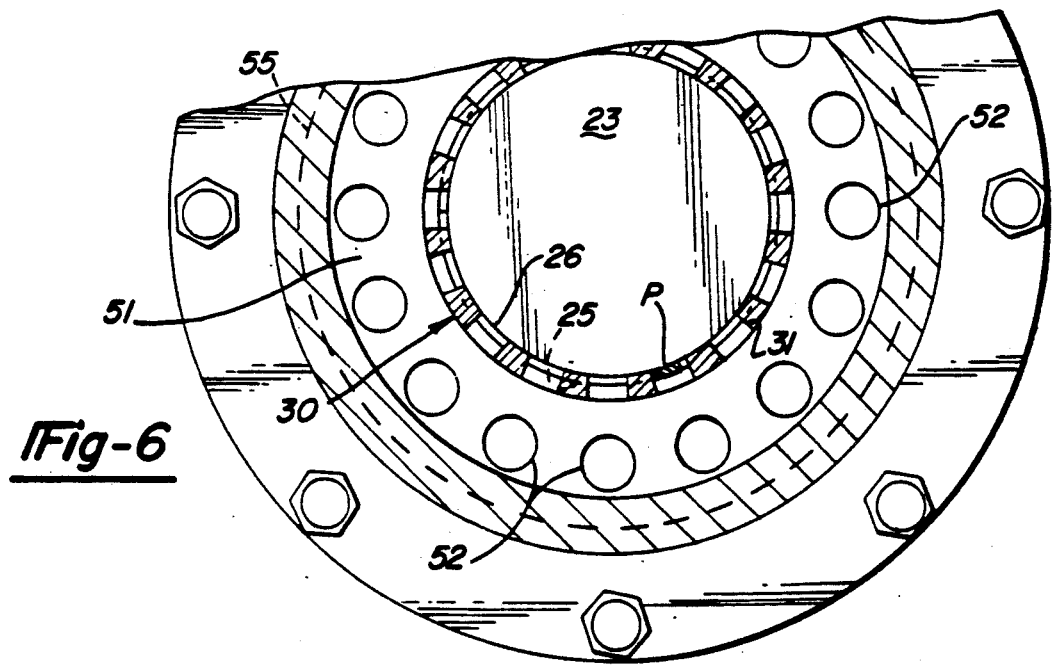
FIG. 6 is a partially cut-away elevational view, on an enlarged scale, of the central portion of the construction shown in FIG. 5.
Figure 7:
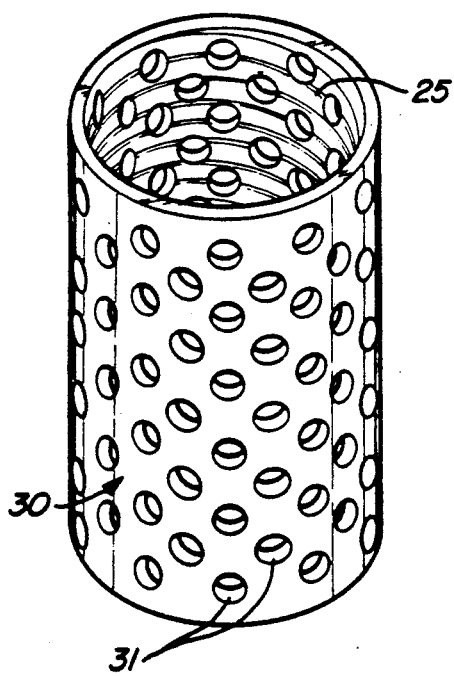
FIG. 7 is a perspective view, showing how a cylindrical frame plate with round holes may be used in place of the axially extending support members of FIG. 1.

Referring now to FIGS. 5 and 6, a modification of the present invention is shown which may be mounted directly in a pipe carrying the fluid or other material to be filtered. As before, the cylindrical frame plate 20 may be constructed of a hollow cylinder 30 having a plurality of circular holes 31 bored therein, and retained between an upper annular member 22 and the lower annular member 23. Circular wire 26 is wound into the helical grooves 25, as before, to form the helical slit 29, and the smooth surface P.

In this embodiment of the invention, the locking devices 28 may be provided at the ends of the wire 26 on the hollow cylinder itself, or, as before in the annular members 22 and 23. Instead of the upper annular member 22 being identical to the lower annular member 23, said upper annular member is different in that it has a large peripheral flange 50 provided thereon. The lower annular member 23 also has a peripheral flange 51 provided thereon, with a plurality of drain holes 52 provided therein for the filtrate to pass through. The peripheral flanges 50 and 51 are retained in annular recesses 55 provided about the inside diameter of both ends of the removable pipe section 56.

Preferably, the thickness of the flanges 50 and 51 are slightly greater than the depths of the corresponding recesses 55 so that the upper annular member 22 and the lower annular member 23 will be tightly held in place when the removable pipe section 56 is bolted to the pipe 57 by the bolt and nut assemblies 58. The bolts 58 may be passed through holes 59 in pipe flanges 60 and enter threaded holes 61 in corresponding flanges 62. As can be seen at the lower end of the removable pipe section 56 in FIG. 5, this means of mounting may be reversed. It should be understood that the thicknesses of the flanges 51 and 52 may vary widely depending upon the application of the cylindrical frame plate 20, and still be well within the scope of the present invention.

Likewise, any practical mounting means may be used to mount the cylindrical frame plate in the removable pipe section 56. For example, radially extending support members may be used in place of the flanges, and these may even be held in place by radially extending fastening means rather than by the axially extending bolts. Any practical mounting means may be used as long as the flow through the pipe is diverted to flow through the center of the upper annular member 22. It is also anticipated that in some applications the lower annular member 23 will not need the flanges 51 thereon, and any practical configuration of the lower annular member 23 is permissible as long as the lower annular member 23 in this embodiment of the invention blocks off the bottom of the hollow cylinder 30 forcing the filtrate to flow through the filter.

It should also be understood that this embodiment of the present invention will work with the other versions of the cylindrical frame plate described herein, such as those shown in FIG. 1 and FIGS. 9-11, as long as appropriate mounting means and appropriate configurations of the upper annular member 22 and the lower annular member 23 are used.

According to the present invention, the helical slit or filtering hole 29 can be formed in such a manner that a smooth, curved, surface is formed on the inner surface of the cylindrical frame plate 20 by means of the helically wound wire 26, whereby the volume treated through the slit or linear treatment hole can be markedly increased. The slit hole can be formed helically by the adjoining gaps between the wire which is helically wound, such that the width can be determined precisely for enabling precision filtering and separation operations.

Because the filter element is formed as a curved surface along the entire inner surface thereof, and a liquid to be treated can be allowed to flow from the inside to the outside, the present invention can be used with wide interchangeability as a permanent filtering and separation element, instead of various disposable filters.

It should be understood that the modification of the invention shown in FIG. 6 is mounted by way of a removable pipe section 56. It is not necessary to so mount it in applications wherein frequent cleaning is not needed.

Thus, by carefully considering the problems present in prior art cylindrical filtering elements of the type having punched hole, net-like or lattice-like filtering holes, in addition to considering the problems of ceramic porous filter elements and the clogging attendant to such prior art designs a new and improved cylindrical filtering element has been provided.

I claim:
1. A cylindrical filtering element comprising:
   (a) a cylindrical frame plate, said cylindrical frame plate including, in combination:
      (i) a plurality of discrete locking grooves having a helical pitch disposed along the inner surface between a first and a second coaxial ends of said cylindrical frame plate, and
      (ii) a wire of uniform cross-section formed into a helix and received in said locking grooves,
      (iii) a plurality of openings; and
   (b) a locking device securing both ends of said wire in said cylindrical frame plate, said pitch and the dimensions of said wire being selected in conjunction with the spacing of said grooves to create a gap between adjacent strands of said wire with said gap acting as a filtration flow path.

2. The cylindrical filtering element as defined in claim 1, wherein said wire of uniform cross-section has the cross-section of an equilateral triangle.

3. The cylindrical filtering element as defined in claim 1, wherein said discrete locking grooves are V-shaped.

4. The cylindrical filtering element as defined in claim 1, wherein said wire of uniform cross-section is of a triangular cross-section, and said discrete locking grooves are V-shaped.

5. The cylindrical filtering element defined in claim 1, wherein said wire of uniform cross-section has a trapezoidal cross-section.

6. The cylindrical filtering element defined in claim 1, wherein said wire of uniform cross-section has a circular cross-section, and said discrete locking grooves are semi-circularly-shaped.

7. The cylindrical filtering element defined in claim 1, wherein said wire of uniform cross-section has an oval cross-section, and said discrete locking grooves are oval shaped.

8. A cylindrical frame plate for filtering and separation including, in combination:
   (a) a first annular member,
   (b) a second annular member coaxial with said first annular member,
   (c) a hollow cylinder connecting said first annular member with said second annular member, said hollow cylinder including:
      (i) filtering holes provided therein,
      (ii) discrete locking grooves having a helical pitch provided in the interior of said hollow cylinder, and
   (d) a wire of uniform cross-section formed into a helix and extending from said first annular member to said second annular member while engaging said discrete helical locking grooves, the resultant cylinder formed by the interior of said wire of said uniform cross-section being a smooth curved surface.

9. The cylindrical frame plate defined in claim 8, wherein the space between said discrete locking grooves having a helical pitch determines the location of each turn of said helically wound wire and the axial distance between each of said helical wires, said spacing establishing the particle size to be filtered through said element.

10. The cylindrical frame plate defined in claim 8, wherein said first and said second annular members each have at least a portion of a concave groove therein, said wire of uniform cross-section extending from said portion of said concave groove in said first annular member to said portion of said concave groove in said lower annular member.

11. The cylindrical frame plate defined in claim 10, and further including:
   (a) a locking device on said first annular member to hold said wire in said portion of said concave groove in said first annular member, and;
   (b) a locking device on said second annular member to hold said wire of said uniform cross-section in said portion of said concave groove in said lower annular member.

12. The cylindrical frame plate defined in claim 10, wherein at least one end of said hollow cylinder has a locking device to hold said wire of said uniform cross-section in said discrete locking groove having a helical pitch.

13. The cylindrical frame plate defined in claim 8, wherein said wire of uniform cross-section has the cross-section of an equilateral triangle.

14. The cylindrical frame plate defined in claim 8, wherein said discrete helical locking grooves are V-shaped.

15. The cylindrical frame plate defined in claim 8, wherein said wire of uniform cross-section is of a circular cross-section, and said discrete helical locking grooves are V-shaped.

16. The cylindrical frame plate defined in claim 8, wherein said wire of uniform cross-section is of a triangular cross-section, and said discrete helical locking grooves are V-shaped.

17. The cylindrical frame plate defined in claim 8, wherein said wire of uniform cross-section has a trapezoidal cross-section.

18. The cylindrical frame plate defined in claim 8, wherein said wire of uniform cross section has a circular cross-section and said concave grooves are circularly shaped.

19. The cylindrical frame plate defined in claim 8, wherein said wire of uniform cross-section has an oval cross-section and said discreet helical locking grooves are oval shaped.

20. A cylindrical filtering element as recited in claim 1, wherein said openings comprise round holes.

21. A cylindrical filtering element as recited in claim 1, wherein said openings comprise square holes.

* * * * *